US012602005B2

(12) United States Patent
Toyota et al.

(10) Patent No.: US 12,602,005 B2
(45) Date of Patent: Apr. 14, 2026

(54) IMAGE FORMING APPARATUS

(71) Applicant: CANON KABUSHIKI KAISHA, Tokyo (JP)

(72) Inventors: Akitoshi Toyota, Kanagawa (JP); Atsushi Oguni, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 18/425,320

(22) Filed: Jan. 29, 2024

(65) Prior Publication Data

US 2024/0255893 A1 Aug. 1, 2024

(30) Foreign Application Priority Data

Jan. 31, 2023 (JP) ................................ 2023-012670

(51) Int. Cl.
*G03G 21/18* (2006.01)
*G03G 21/20* (2006.01)

(52) U.S. Cl.
CPC ..... *G03G 21/1814* (2013.01); *G03G 21/1828* (2013.01); *G03G 21/206* (2013.01)

(58) Field of Classification Search
None
See application file for complete search history.

(56) References Cited

U.S. PATENT DOCUMENTS

2007/0146739 A1* 6/2007 Igarashi ............... G03G 21/206 358/1.7
2010/0098452 A1* 4/2010 Inaba ................. G03G 21/1853 399/92
2011/0280609 A1* 11/2011 Nakazawa ........... G03G 21/206 399/92
2012/0219314 A1* 8/2012 Nozaki .............. G03G 21/1619 399/92
2014/0140719 A1* 5/2014 Suzuki ............... G03G 15/0189 399/92
2017/0160699 A1* 6/2017 Imanari ................ G03G 21/206
(Continued)

FOREIGN PATENT DOCUMENTS

JP 05-241384 A 9/1993
JP 11-305634 A 11/1999
(Continued)

OTHER PUBLICATIONS

Machine translation of Hiroshi.*

*Primary Examiner* — Sevan A Aydin
(74) *Attorney, Agent, or Firm* — Venable LLP

(57) ABSTRACT

An image forming apparatus includes an apparatus body including a fan and a duct portion including (i) a first opening from which an airflow blows and (ii) a projecting portion configured to guide the airflow to the first opening, and a process cartridge including a photosensitive drum, a developing roller, and a casing including a first side surface in which a second opening is formed. The second opening communicates with a space inside the process cartridge, to which a surface of the photosensitive drum and a surface of the developing roller are exposed. When viewed in a rotational axis direction of the photosensitive drum, the first opening and the second opening overlap. In the rotational axis direction, the projecting portion projects in a direction away from an attachment space in which the process cartridge is attached.

20 Claims, 9 Drawing Sheets

(56) References Cited

U.S. PATENT DOCUMENTS

| | | | | |
|---|---|---|---|---|
| 2021/0096511 | A1* | 4/2021 | Okawa | G03G 21/1814 |
| 2021/0333754 | A1* | 10/2021 | Okawa | G03G 21/1814 |
| 2022/0244678 | A1* | 8/2022 | Abe | G03G 21/206 |

FOREIGN PATENT DOCUMENTS

| | | | | |
|---|---|---|---|---|
| JP | 2000-330457 | A | | 11/2000 |
| JP | 2003-241624 | A | | 8/2003 |
| JP | 2011022608 | A | * | 2/2011 |

* cited by examiner

IMAGE FORMING APPARATUS

BACKGROUND OF THE INVENTION

Field of the Invention

This disclosure relates to an image forming apparatus that forms an image on a recording material.

Description of the Related Art

In image forming apparatuses of an electrophotographic system, toner used as developer sometimes degrades due to a temperature increase in an interior of the apparatuses. In Japanese Patent Application Laid-Open No. 2003-241624, it is described that cooling airflow from a fan disposed in an image forming apparatus body flows in an interior of a process cartridge via an opening disposed in a side cover of the process cartridge, and cools a photosensitive drum and a developing sleeve.

With a configuration of the referenced literature, since an opening that is disposed in a duct to blow the cooling airflow of the fan toward the process cartridge, and an opening that is disposed on a process cartridge side to take in the cooling airflow are placed in positions separated from each other in a rotational axis direction of the photosensitive drum, the loss of the cooling airflow occurs.

SUMMARY OF THE INVENTION

According to one aspect of the invention, an image forming apparatus includes an apparatus body including a fan and a duct portion through which airflow generated by the fan flows, the duct portion including (i) a first opening from which the airflow blows and (ii) a projecting portion configured to guide the airflow to the first opening, and a process cartridge that is detachable from the apparatus body and is attached to the apparatus body in a position in which the process cartridge receives the airflow blown from the first opening, the process cartridge including a photosensitive drum, a developing roller configured to supply developer to the photosensitive drum, and a casing including a first side surface in which a second opening is formed, wherein the second opening communicates with a space inside the process cartridge, to which a surface of the photosensitive drum and a surface of the developing roller are exposed, wherein, when viewed in a rotational axis direction of the photosensitive drum, the first opening and the second opening overlap, and wherein, in the rotational axis direction, the projecting portion projects in a direction away from an attachment space in which the process cartridge is attached.

Further features of the present invention will become apparent from the following description of exemplary embodiments with reference to the attached drawings.

DESCRIPTION OF THE EMBODIMENTS

Hereinafter, with reference to drawings, embodiments of this disclosure will be described. To be noted, the embodiments described below are exemplary, and, for example, details of the configuration can be appropriately modified by those skilled in the art within the scope that does not depart from the intent of this disclosure.

First Embodiment

Image Forming Apparatus

Figure 1:
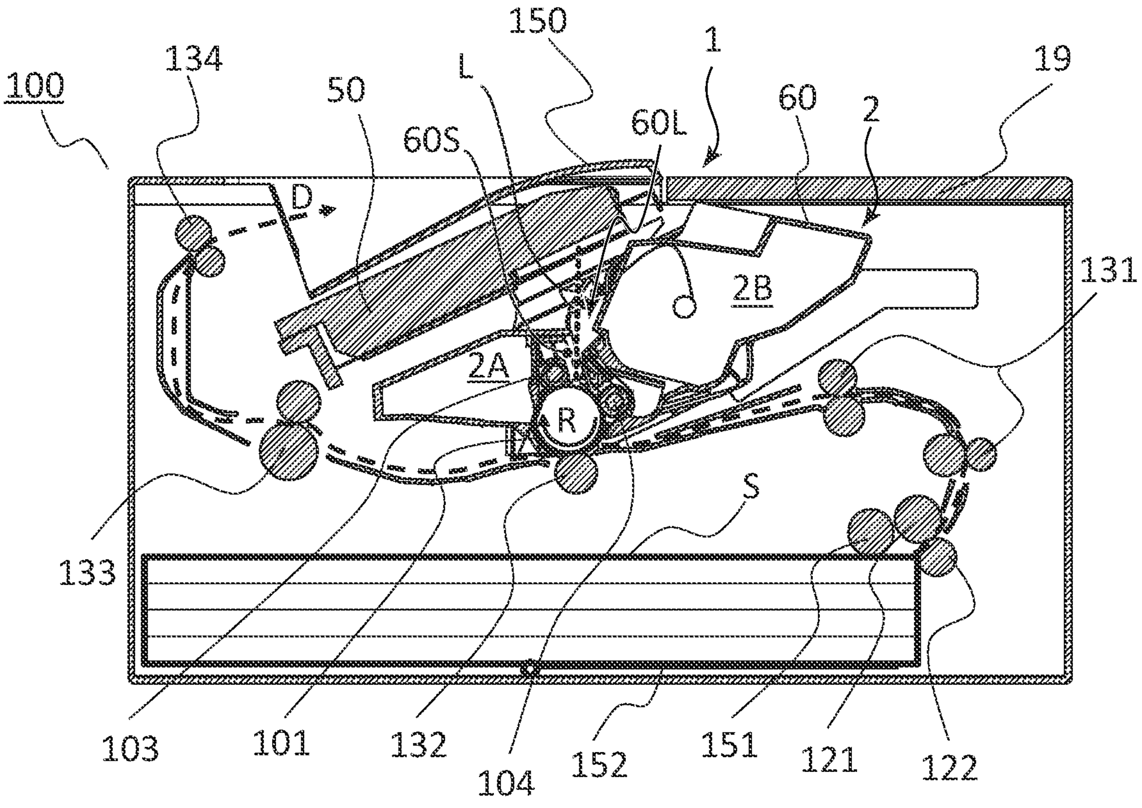
FIG. 1 is a schematic diagram illustrating an image forming apparatus of a first embodiment.

First, an overall configuration of an image forming apparatus of a first embodiment will be described. FIG. 1 is a schematic diagram illustrating a cross section of the image forming apparatus 100 of the first embodiment. The image forming apparatus 100 is, for example, an image forming apparatus of an electrophotographic system that forms an image on a sheet S, serving as a recording material (recording medium), based on image information received from an external information processing apparatus. As for the sheet S, it is possible to use various sheet materials which are different in size and materials, including paper such as regular paper and thin paper, a surface treated sheet material such as coated paper, a specially shaped sheet material such as an envelope and an index sheet, a plastic film, cloth, and the like.

The image forming apparatus 100 includes an image forming apparatus body (hereinafter, referred to as an apparatus body 1) and a process cartridge 2. By opening an opening/closing member 19 disposed in the apparatus body 1, the process cartridge 2 can be attached to and detached from (i.e., attachable/detachable with respect to) the apparatus body 1. The apparatus body 1 is a part of the image forming apparatus 100, excluding the process cartridge 2.

The process cartridge 2 includes a photosensitive drum 101, a charge roller 103, a developing roller 104, and a casing 60. Each of the photosensitive drum 101, the charge roller 103, and the developing roller 104 is rotatably supported by the casing 60. A configuration of the casing 60 will be described below.

The photosensitive drum 101 is, for example, a photosensitive member in which an organic photosensitive layer is coated onto an outer circumference of a cylindrical base body. The photosensitive drum 101 serves as an image bearing member bearing an electrostatic latent image and a toner image. The charge roller 103 is an example of a charge unit charging a surface of the photosensitive drum 101. The developing roller 104 rotates while bearing toner, serving as developer, and serves as a developing unit (developer bearing member) supplying the toner to the photosensitive drum 101.

The apparatus body 1 includes an exposure unit 50, a transfer roller 132, and a fixing unit 133, serving as process units that perform an electrophotographic process with the process cartridge 2. The exposure unit 50 is an example of an exposing portion that exposes the surface of the photosensitive drum 101. The exposure unit 50 of the present example is arranged above the process cartridge 2. The transfer roller 132 is an example of a transfer unit that transfers the image (toner image) from the photosensitive drum 101 onto the sheet S. A transfer portion is formed as a nip portion between the transfer roller 132 and the photosensitive drum 101. The fixing unit 133 includes, for example, a fixing roller pair (a fixing roller and a pressing roller) that nips and conveys the sheet S, and a heating unit, such as a halogen lamp or an induction heating mechanism, that heats the fixing roller. The fixing unit 133 is an example of a fixing portion that fixes the image, which has been transferred onto the sheet S, on the sheet S.

Further, the apparatus body 1 includes a sheet feed tray 152, a pickup roller 151, a feed roller 121, a separation roller 122, a conveyance roller pair 131, and a sheet discharge roller pair 134. The pickup roller 151, the feed roller 121, and the separation roller 122 are examples of feed units that feed the sheet while separating the sheet S into one sheet at a time. The conveyance roller pair 131 and the sheet discharge roller pair 134 are examples of conveyance units that convey the sheet S.

When the image forming apparatus 100 receives the image information, the image forming apparatus 100 starts an image forming operation. A lift plate (sheet supporting portion) of the sheet feed tray 152 lifts the sheets S. Thereby, the pickup roller 151 comes into contact with an uppermost sheet of the sheets S, and sends the sheet(s) S in a sheet feed direction (to the right in FIG. 1). The sheet(s) S sent from the sheet feed tray 152 is separated such that only the uppermost sheet S passes through a separation nip between the feed roller 121 and the separation roller 122. The sheet S that has passed through the separation nip is conveyed toward the transfer portion by the conveyance roller pair 131.

On the other hand, in the process cartridge 2, the photosensitive drum 101 is rotatably driven in an arrow R direction in FIG. 1 by a drive motor and a drive transmission mechanism, not shown, disposed in the apparatus body 1. By applying a charge voltage, the charge roller 103 uniformly charges the surface of the photosensitive drum 101. The exposure unit 50 irradiates the photosensitive drum 101 with a laser beam L, which is modulated according to a video signal based on the image information, and forms the electrostatic latent image on the surface of the photosensitive drum 101. The developing roller 104 supplies the toner to the photosensitive drum 101, and develops the electrostatic latent image into the toner image.

By applying a transfer voltage, the transfer roller 132 transfers the toner image from the photosensitive drum 101 onto the sheet S when the sheet S passes through the transfer portion. The sheet S that has passed through the transfer portion is sent to the fixing unit 133. When the sheet S passes through the fixing roller pair, the toner image on the sheet S is heated and pressed. Thereby, the toner image is fixed on the sheet S. The sheet S that has passed through the fixing unit 133 is discharged outside of the image forming apparatus 100 by the sheet discharge roller pair 134, and stacked on a sheet discharge tray 150 disposed on an upper surface of the apparatus body 1.

In the descriptions and diagrams described below, a rotational axis direction of the photosensitive drum 101 in a state in which the process cartridge 2 is attached into the apparatus body 1 is referred to as an X direction. A vertical direction (a direction along the direction of gravitational force) in a state in which the image forming apparatus 100 is installed on a horizontal surface is referred to as a Z direction. A direction intersecting with both the X and Z directions is referred to as a Y direction. The X, Y, and Z directions are preferably orthogonal to each other. As necessary, an arrowhead side of an illustrated arrow is indicated by a "+" sign, and an arrow tail side is indicated by a "–" sign. For example, a "+Z side" indicates an upper side in the vertical direction, and a "—Z side" indicates a lower side in the vertical direction. Further, regarding constituent elements of the process cartridge 2, their positions, shapes, and the like are described based on their states attached into the apparatus body 1.

Air Blowing Path

Figure 2A:
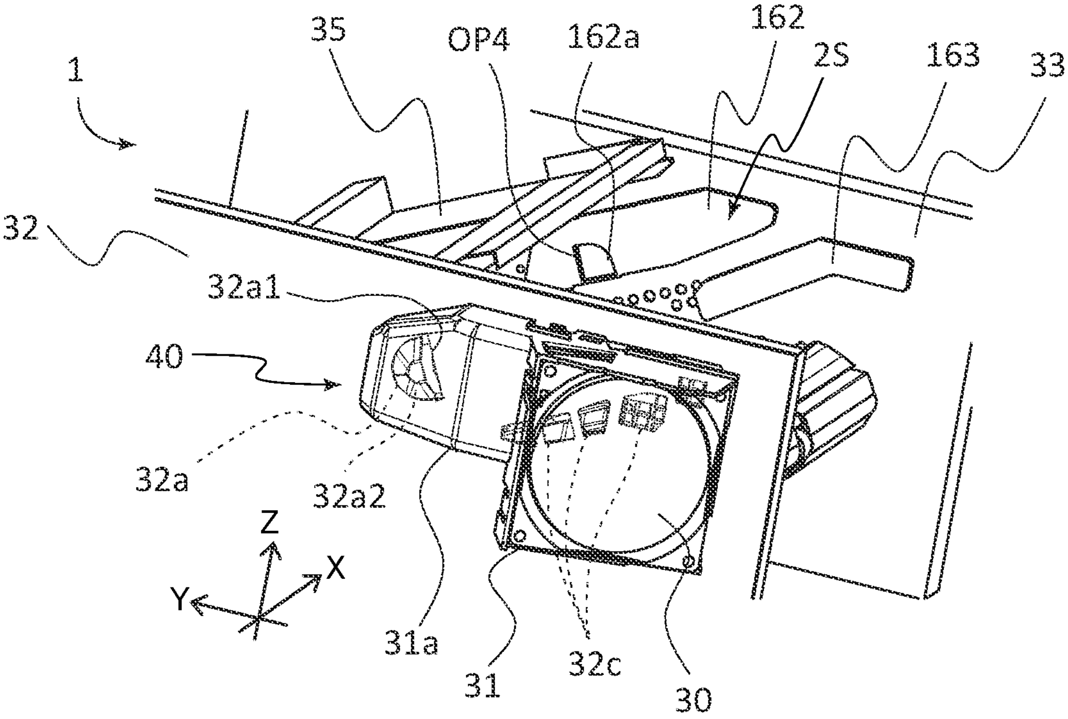
FIGS. 2A and 2B are perspective views illustrating a part of an apparatus body of the first embodiment.
Figure 2B:
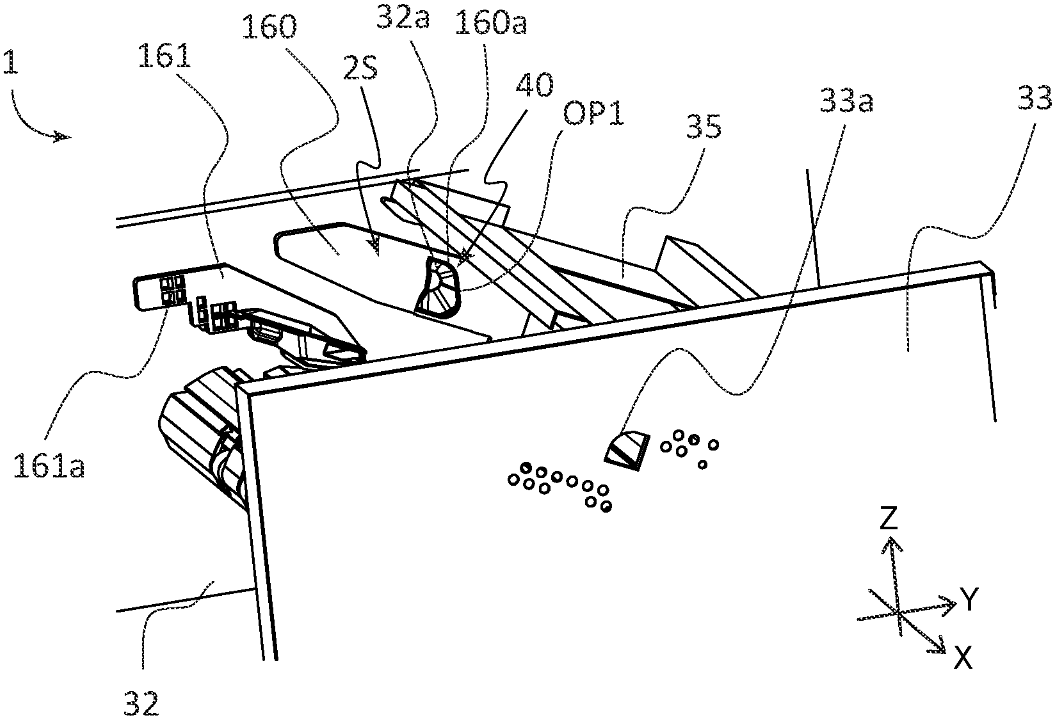

FIGS. 2A and 2B are diagrams illustrating a configuration of an air-blowing duct portion 40 of the first embodiment. In FIGS. 2A and 2B, an outer cover of the apparatus body 1 is not illustrated. FIG. 2A is a perspective view illustrating the apparatus body 1 when viewed from a –X side. FIG. 2B is a perspective view illustrating the apparatus body 1 when viewed from a +X side.

As illustrated in FIGS. 2A and 2B, a frame body of the apparatus body 1 includes side frames 32 and 33, and a connection frame 35. Each of the side frames 32 and 33 and the connection frame 35 is an example of a frame member forming the frame body of the apparatus body 1. The side frames 32 and 33 and the connection frame 35 are constituted by, for example, a sheet metal made from metal such as stainless steel.

The side frames 32 and 33 are plate-shaped members (side plates) each extending in a direction intersecting with the X direction. The side frames 32 and 33 of the present example extend substantially perpendicularly with respect to the X direction. The side frame 32 is positioned on one side (–X side) in the X direction with respect to an attachment space 2S into which the process cartridge 2 is attached. The side frame 33 is positioned on the other side (+X side) in the X direction with respect to the attachment space 2S of the process cartridge 2. In other words, the side frames 32 and 33 face each other so as to form the attachment space 2S between the side frames 32 and 33. The image forming operation using the process cartridge 2 is performed in a state in which the process cartridge 2 has been attached to the attachment space 2S.

The connection frame 35 extends in the X direction between the side frames 32 and 33, and is connected to each of the side frames 32 and 33. The connection frame 35 is positioned above the attachment space 2S of the process cartridge 2. To be noted, the exposure unit 50 (refer to FIG. 1) is arranged on an upper surface side of the connection frame 35.

As illustrated in FIGS. 2A and 2B, a fan 30, a holder 31, and guide members 160 and 161 are arranged to the side frame 32 on the one side (–X side) in the X direction. That is, the apparatus body 1 includes the fan 30, the holder 31, and the guide members 160 and 161. Further, the apparatus body 1 includes the air-blowing duct portion 40, serving as a duct portion, described below.

The fan 30 draws air from the outside of the apparatus body 1, and generates airflow such that cooling airflow is blown to an interior of the apparatus body 1. The fan 30 is arranged such that an internal blowing member (blade) rotates around a rotational axis extending substantially in the X direction. A rotational axis direction of the blowing member may be parallel to the X direction, or may be inclined with respect to the X direction. In the present example, the fan 30 is a so-called axial fan. The holder 31 is secured to the side frame 32, and holds the fan 30.

The fan 30 and the holder 31 are arranged on an outer surface (surface opposite to the attachment space 2S of the process cartridge 2 in the X direction) of the side frame 32. That is, in the present example, the process cartridge 2 is arranged on a first side (+X side) in the rotational axis direction of the photosensitive drum 101 with respect to the side frame 32 (frame member, side plate). Further, the fan 30 is arranged on a second side (−X side) in the abovementioned rotational axis direction with respect to the side frame 32 (frame member, side plate).

Guide members 160 to 163 are members that guide the process cartridge 2 when attaching and detaching the process cartridge 2 with respect to the apparatus body 1. The guide members 160 to 163 are arranged on inner surfaces (surfaces on a side of the attachment space 2S of the process cartridge 2 in the X direction) of the side frames 32 and 33. Shapes of the guide members 160 to 163 will be described below.

The air-blowing duct portion 40 is an example of a duct portion through which the cooling airflow (airflow) generated by the fan 30 flows. The side frame 33 includes a ventilation hole 33*a*. The ventilation hole 33*a* forms part of a path that discharges the airflow, which has been discharged outside from an interior of the process cartridge 2, to the outside of the apparatus body 1.

The air-blowing duct portion 40 of the present example includes a projecting portion 31*a* of the holder 31, an air passage forming portion 32*a* disposed in the side frame 32, and a ventilation hole 160*a* disposed in the guide member 160.

The ventilation hole 160*a* of the guide member 160 is formed so as to penetrate through the guide member 160 in the X direction. The ventilation hole 160*a* faces the air passage forming portion 32*a* of the side frame 32 in the X direction, and communicates with the air passage forming portion 32*a*.

An opening portion (+X side edge of the ventilation hole 160*a*) at which the ventilation hole 160*a* is open to the attachment space 2S is referred to as a first opening OP1 of the present example. The first opening OP1 is an air outlet through which the cooling airflow is blown from the air-blowing duct portion 40, which is disposed in the apparatus body 1, toward the process cartridge 2 which is attached into the attachment space 2S. That is, the first opening OP1 is a part of the air-blowing duct portion 40 (duct portion). In other words, the state in which the process cartridge 2 is attached into the attachment space 2S can be said to be a state in which the process cartridge 2 is attached to a position in which the process cartridge 2 receives the airflow that is blown from the first opening OP1. The first opening OP1 is arranged so as to face a second opening OP2 (refer to FIG. 4A), described below, of the process cartridge 2 in the X direction.

When viewed in the X direction, the air passage forming portion 32*a* of the side frame 32 is arranged in a position apart from the fan 30. The projecting portion 31*a* is a portion where part of the holder 31 projects toward a side of the air passage forming portion 32*a*. An air passage from the fan 30 toward the air passage forming portion 32*a* is formed between the projecting portion 31*a* and the side frame 32.

The air passage forming portion 32*a* of the side frame 32 includes a ventilation hole 32*al* penetrating through the side frame 32 in the X direction, and an intake portion 32*a*2 formed so as to project outward in the X direction with respect to the ventilation hole 32*al*. A direction in which the intake portion 32*a*2 projects can be said to be a direction away from the attachment space 2S in the X direction.

The ventilation hole 32*al* forms an air passage that guides the cooling airflow from the fan 30, which is arranged on an outer side with respect to the side frame 32 in the X direction, to a space (attachment space 2S) on an inner side with respect to the side frame 32 in the X direction. The ventilation hole 32*al* is an example of a through hole that penetrates through the side frame 32 (frame member, side plate) in the rotational axis direction of the photosensitive drum 101, and allows the airflow from the fan 30 to flow from the second side (−X side) to the first side (+X side) of the side frame 32 (frame member, side plate).

The intake portion 32*a*2 projects outward in the X direction with respect to the side frame 32, and is formed so as to cover the ventilation hole 32*al* when viewed in the X direction. The intake portion 32*a*2 includes an opening configured to take in the cooling airflow. The intake portion 32*a*2 of the present example is formed substantially in a hemispherical shape opening toward a base side (side that is close to the fan 30) of the projecting portion 31*a* of the holder 31. Further, the intake portion 32*a*2 (projecting portion) of the present example is formed integrally with the side frame 32 (side plate) by such as drawing.

By the intake portion 32*a*2, the cooling airflow that flows along an outer surface of the side frame 32 is guided toward the first opening OP1 disposed on an inner side of the side frame 32 in the X direction. That is, the intake portion 32*a*2 has a projecting shape (projecting portion) formed so as to project toward the second side (−X side) with respect to the side frame 32 (frame member, side plate) in the rotational axis direction of the photosensitive drum 101, and is an example of a projecting shape (projecting portion) that guides the airflow from the fan 30 to the first opening OP1. In other words, in the X direction (rotational axis direction of the photosensitive drum 101), the intake portion 32*a*2 projects in a direction away from the attachment space 2S into which the process cartridge 2 is attached.

Further, in the present example, the intake portion 32*a*2 (projecting portion) of the side frame 32 and the first opening OP1 disposed in the guide member 160 overlap when viewed in the X direction.

To be noted, ventilation holes 161*a* are formed in the guide member 161. The ventilation holes 161*a* are ventilation holes penetrating through the guide member 161 in the X direction. Further, in positions facing the ventilation holes 161*a*, ventilation holes 32*c* penetrating through the side frame 32 in the X direction are disposed in the side frame 32. In the present example, when viewed in the X direction, the ventilation holes 161*a* are arranged in positions in which part of the ventilation holes 161*a* overlaps a rotational trajectory of the blowing member of the fan 30. Further, when viewed in the rotational axis direction of the blowing member of the fan 30, the ventilation holes 161*a* are arranged in positions in which part of the ventilation holes 161*a* overlaps the rotational trajectory of the blowing member of the fan 30. Part of the cooling airflow that is generated by the fan 30 flows toward the process cartridge 2 through the ventilation holes 161*a*.

Air Discharging Path

The guide members 162 and 163 are arranged on the side frame 33 on the other side (+X side) in the X direction. A ventilation hole 162*a* (refer to FIG. 2A) penetrating through the guide member 162 in the X direction is formed in the guide member 162. Further, the ventilation hole 33*a* (refer to FIG. 2B) penetrating through the side frame 33 in the X direction is formed in the side frame 33. The ventilation hole 162*a* of the guide member 162 and the ventilation hole 33*a* of the side frame 33 are part of an air discharging path (discharging duct portion) for discharging the cooling airflow, which has cooled cooling objects, such as the process cartridge 2, inside of the apparatus body 1, to the outside of the apparatus body 1.

The ventilation hole 33*a* of the side frame 33 forms an air passage that discharges the cooling airflow from an inner space (attachment space 2S) with respect to the side frame 33 in the X direction to an outer space with respect to the side frame 33 in the X direction.

The ventilation hole 162*a* of the guide member 162 is formed so as to penetrate through the guide member 162 in the X direction. The ventilation hole 162*a* faces the ventilation hole 33*a* of the side frame 33 in the X direction, and communicates with the ventilation hole 33*a*.

An opening portion (−X side edge of the ventilation hole 162*a*) at which the ventilation hole 162*a* is open to the attachment space 2S is referred to as a fourth opening OP4 in the present example. The fourth opening OP4 is arranged so as to face a third opening OP3 (refer to FIG. 4B), described below, of the process cartridge 2. The fourth opening OP4 is an opening of the apparatus body 1, which receives the cooling airflow, which has been discharged outside of the process cartridge 2 via the third opening OP3, such that the cooling airflow is discharged to the outside of the image forming apparatus 100.

Figure 3A:
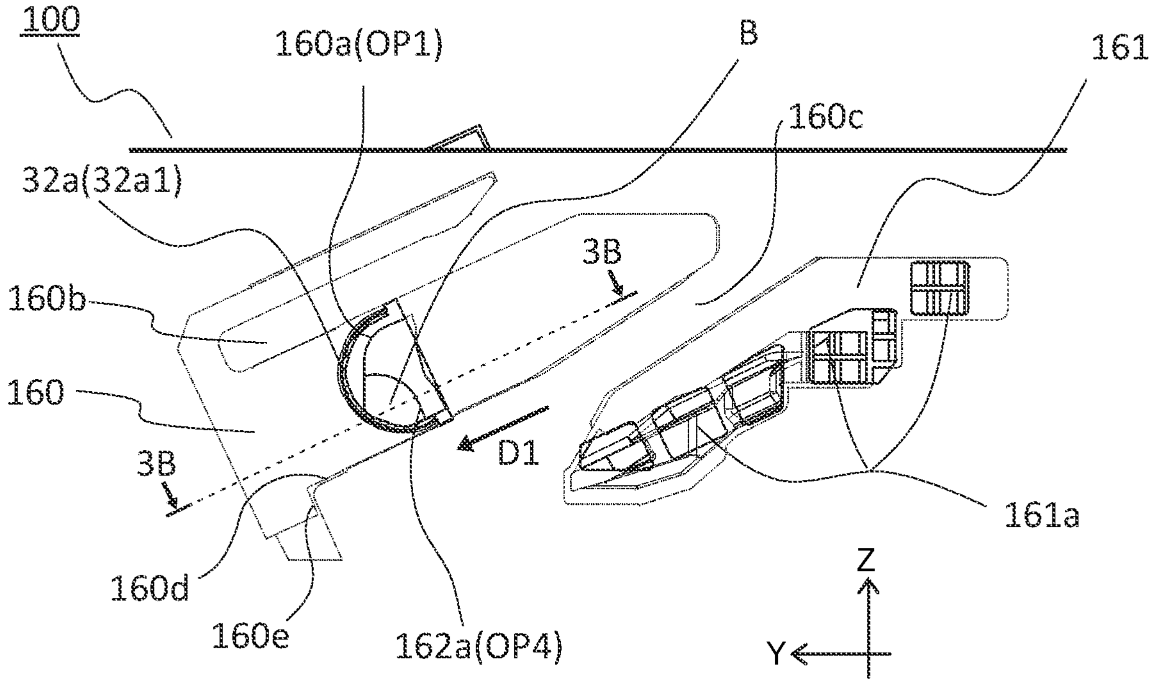
FIGS. 3A and 3B are cross-sectional views illustrating a configuration of the apparatus body of the first embodiment.
Figure 3B:
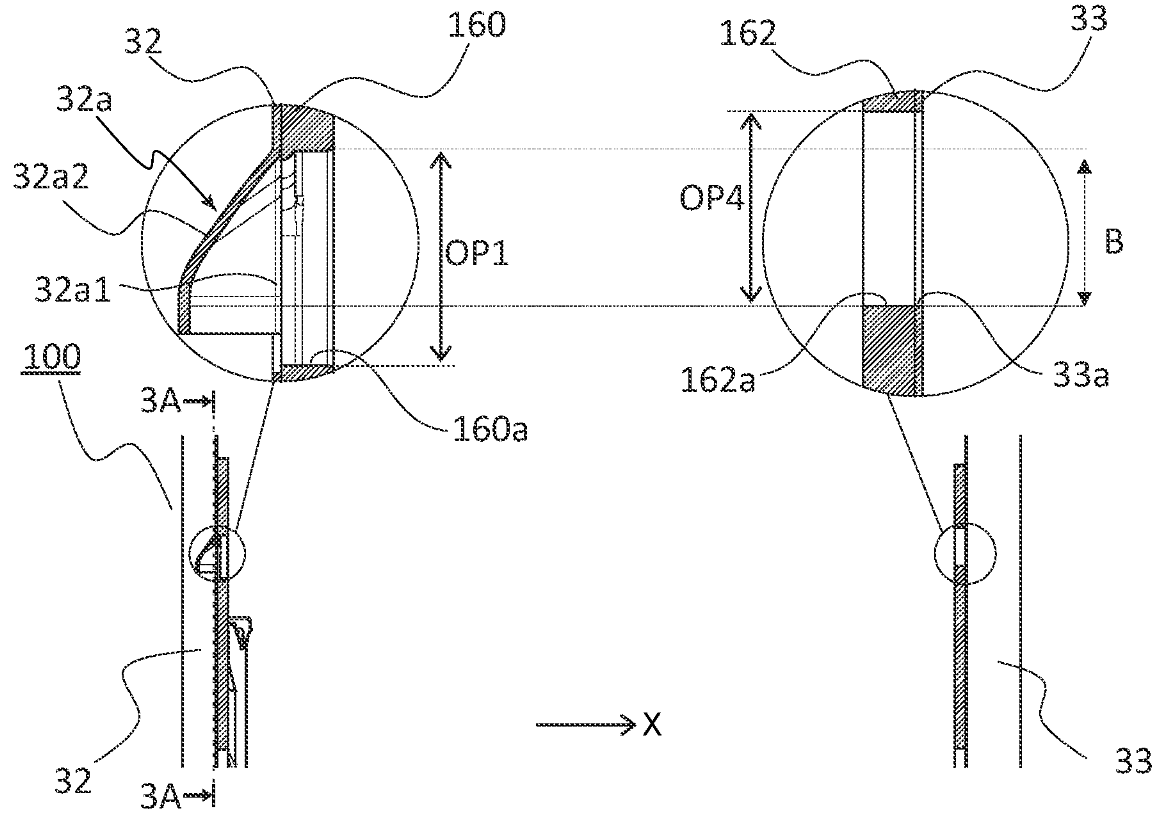

Positional Relationship between Air-Blowing Duct Portion and Air Discharging Path FIGS. 3A and 3B are diagrams illustrating a positional relationship between the air-blowing duct portion 40 and the air discharging path in the apparatus body 1. FIG. 3A is a cross-sectional view illustrating the apparatus body 1 taken along the line 3A-3A in FIG. 3B, when viewed from the −X side. A lower section of FIG. 3B illustrates cross-sectional views of the apparatus body 1 taken along the line 3B-3B in FIG. 3A, and an upper section of FIG. 3B illustrates enlarged views of segments thereof.

As illustrated in FIGS. 3A and 3B, when viewed in the X direction, the first and fourth openings OP1 and OP4 of the apparatus body 1 overlap. It is noted that the term "two openings overlap when viewed in a predetermined direction" refers to a positional relationship in which, when viewed in the predetermined direction, at least a portion of an opening region of one opening (i.e., region inside its opening edge) is positioned within an opening region of the other opening. That is, in a case where the first and fourth openings OP1 and OP4 are projected onto an imaginary plane orthogonal to the X direction, projected regions of the first and fourth openings OP1 and OP4 overlaps at least partially.

As illustrated in FIGS. 3A and 3B, the first and fourth openings OP1 and OP4 of the present example overlap in a region B when viewed in the X direction. In other words, the region B is a part of the opening region of the first opening OP1 when viewed in the X direction, and is a part of the opening region of the fourth opening OP4 when viewed in the X direction. To be noted, when viewed in the X direction, the first and fourth openings OP1 and OP4 may have an identical shape, and the respective opening regions may align with each other.

In the present example, when viewed in the X direction, the ventilation hole 32*al* of the side frame 32 and the first opening OP1 disposed in the guide member 160 overlap. Further, in the present example, when viewed in the X direction, the fourth opening OP4 disposed in the guide member 162 and the ventilation hole 33*a* of the side frame 33 overlap. Further, when viewed in the X direction, the ventilation hole 32*a*1, the first opening OP1, the fourth opening OP4, and the ventilation hole 33*a* overlap in the region B.

As described above, in the present example, the ventilation holes 32*a*1, 160*a*, 162*a*, and 33*a* that form the air passage in the apparatus body 1 are arranged in a straight line along the X direction.

Configuration of Process Cartridge

Figure 4A:
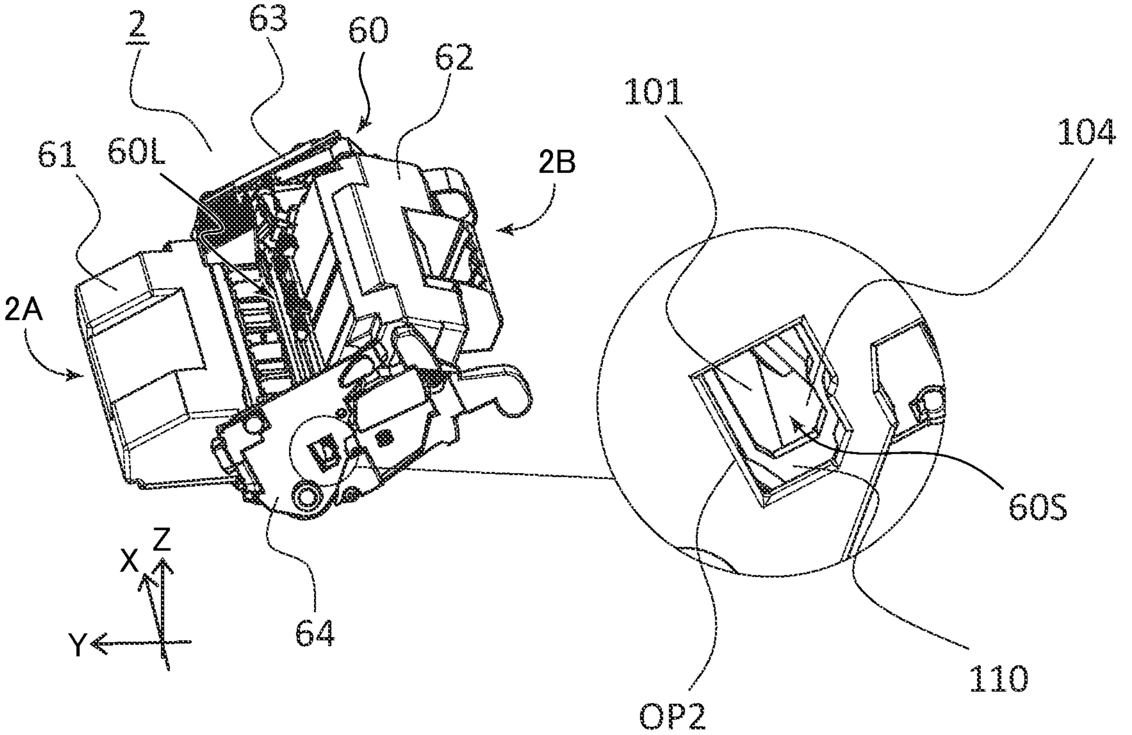
FIGS. 4A and 4B are perspective views illustrating a process cartridge of the first embodiment.
Figure 4B:
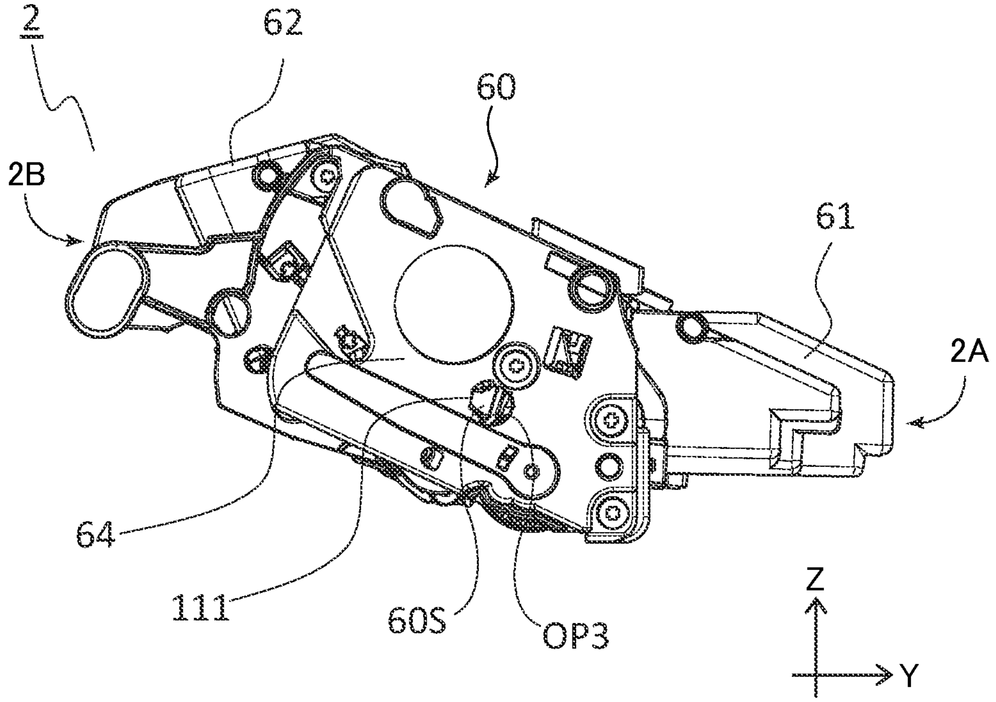
Figure 5A:
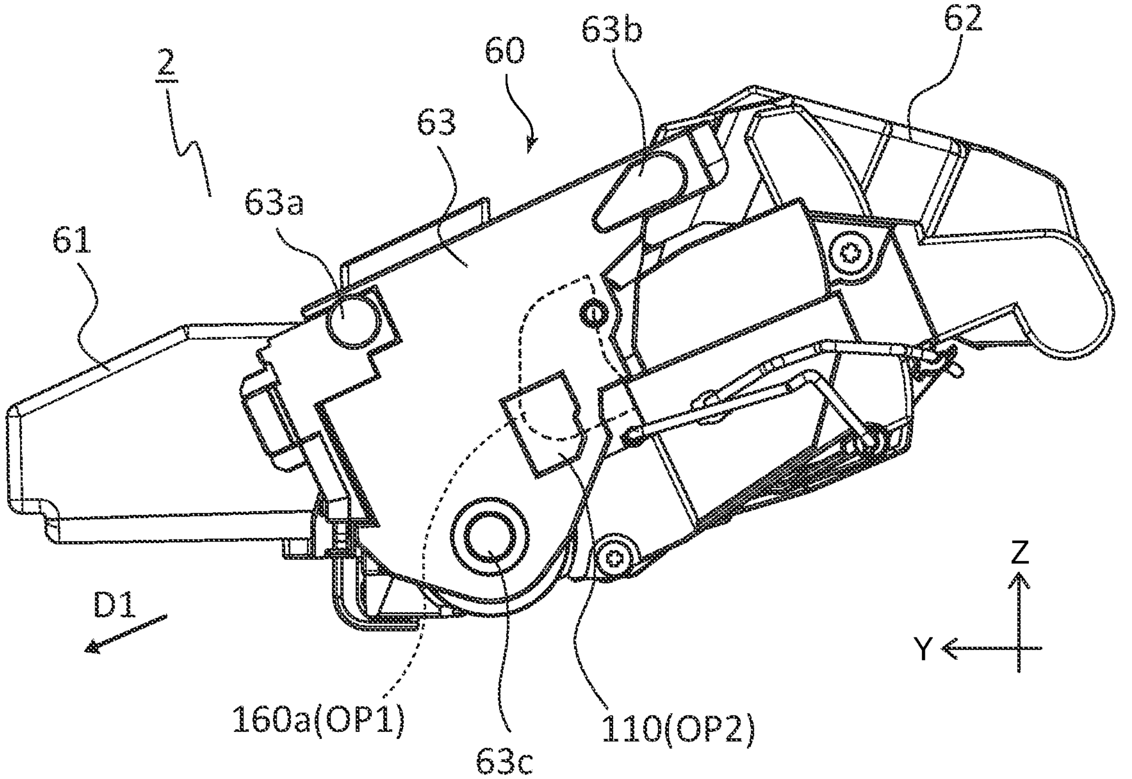
FIGS. 5A and 5B are side views illustrating the process cartridge of the first embodiment.
Figure 6A:
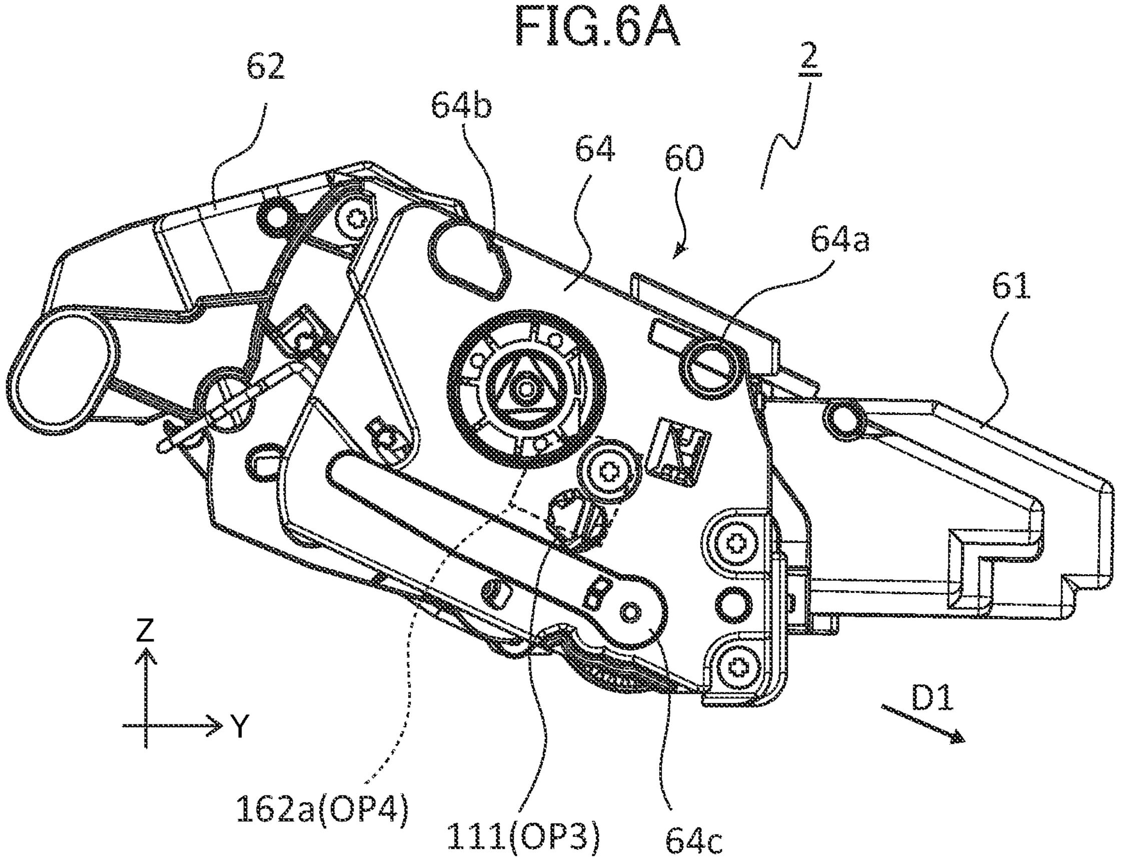
FIGS. 6A and 6B are side views illustrating the process cartridge of the first embodiment.

Using FIGS. 4A, 4B, 5A, and 6A, a configuration of the process cartridge 2 will be described. The left side of FIG. 4A is a perspective view illustrating the process cartridge 2, and the right side is an enlarged view of a segment thereof. FIG. 4B is a side view illustrating the process cartridge 2 when viewed from the +X side. FIG. 5A is a side view illustrating the process cartridge 2, when viewed from the −X side, with an outline of the first opening OP1 of the apparatus body 1 superimposed. FIG. 6A is a side view illustrating the process cartridge 2, when viewed from the +X side, with an outline of the fourth opening OP4 of the apparatus body 1 superimposed.

First, a configuration of the casing 60 of the process cartridge 2 will be described. The casing 60 holds the photosensitive drum 101 and the developing roller 104. The photosensitive drum 101 and the developing roller 104 may be held by a single frame or single member of the casing 60, or may be held by a plurality of frames or plurality of members of the casing 60. That is, the casing 60 may include a frame that holds both the photosensitive drum 101 and the developing roller 104, or may include a frame that holds one of the photosensitive drum 101 and the developing roller 104, and another frame that holds the other of the photosensitive drum 101 and the developing roller 104. Further, the casing 60 may include a frame that does not have a function of holding the photosensitive drum 101 or the developing roller 104. In the present example, as illustrated in FIG. 4A, the casing 60 includes a first frame 61, a second frame 62, and side frames 63 and 64.

The first frame 61 holds the photosensitive drum 101 and the charge roller 103 (refer to FIG. 1). In an interior of the first frame 61, it is possible to dispose a storage portion that stores waste toner collected from the photosensitive drum 101. The first frame 61, the photosensitive drum 101, and the charge roller 103 form a first unit 2A (photosensitive member unit) of the process cartridge 2.

The second frame 62 holds the developing roller 104. In an interior of the second frame 62, a storage portion that stores the toner, serving as the developer, is disposed. The second frame 62 and the developing roller 104 form a second unit 2B (developing unit) of the process cartridge 2. Between the first and second frames 61 and 62, a gap (exposure opening 60L) through which light (laser beam Lin FIG. 1) emitted to the photosensitive drum 101 by the exposure unit 50 (refer to FIG. 1) passes is formed. In the present example, the second frame 62 is movable with respect to the first frame 61.

The side frame 63 is arranged on one side (−X side) in the X direction with respect to the first and second frames 61 and 62. The side frame 63 is substantially in a plate shape extending in a plane intersecting with the X direction. The side frame 63 forms at least part of a side surface (first side surface) on the −X side of the process cartridge 2.

As illustrated in FIG. 4B, the side frame 64 is arranged on the other side (+X side) in the X direction with respect to the first and second frames 61 and 62. The side frame 64 is substantially in a plate shape extending in a plane intersecting with the X direction. The side frame 64 forms at least part of a side face (second side surface) on the +X side of the process cartridge 2.

As illustrated in FIG. 5A, projections 63*a*, 63*b*, and 63*c* are arranged on a surface on an outer side (−X side) of the side frame 63. As illustrated in FIG. 6A, projections 64*a*, 64*b*, and 64*c* are arranged on a surface on an outer side (+X side) of the side frame 64. The projections 63*a*, 63*c*, 64*a*, and 64*c* are examples of guided portions that are guided by the guide members 160 to 163 when attaching and detaching the process cartridge 2 with respect to the apparatus body 1. Further, the projections 63*b*, 63*c*, 64*b*, and 64*c* are examples of positioned portions by which the process cartridge 2 is positioned with respect to the apparatus body 1.

In particular, in a case where the process cartridge 2 is attached into the apparatus body 1, the projection 63*a* of the side frame 63 engages with a guide groove 160*b* (refer to FIG. 3A) disposed in the guide member 160. Further, the projection 63*c* of the side frame 63 engages with a guide groove 160*c* between the guide member 160 and the guide member 161. Similar guide grooves are disposed in the guide members 162 and 163, the projections 64*a* and 64*c* of the side frame 64 engage with the guide grooves of the guide members 162 and 163. Thereby, a moving direction of the process cartridge 2 is regulated to align with a predetermined attachment direction D1 along the guide grooves 160*b* and 160*c*.

When the process cartridge 2 reaches a predetermined attaching position (position where it becomes possible for the image forming apparatus 100 to perform the image forming operation), the process cartridge 2 is positioned by the projections 63*b*, 63*c*, 64*b*, and 64*c*. That is, when the projection 63*c* comes into contact with an abutment surface 160*e* (refer to FIG. 3A), the process cartridge 2 is positioned in the attachment direction D1. Further, when a lower surface and an upper surface of the projection 63*c* respectively come into contact with a lower edge of the groove 160*b* and an abutment surface 160*d* of the guide member 160, the process cartridge 2 is positioned in a direction intersecting with the attachment direction D1 when viewed in the X direction. A similar lower edge and abutment surfaces are disposed in the guide member 162. Therefore, when the projections 64*b* and 64*c* of the side frame 64 respectively come into contact with the lower edge and the abutment surfaces, the process cartridge 2 is positioned in the attachment direction D1 and in the direction intersecting with the attachment direction D1.

To be noted, the projections 63*c* and 64*c* can be arranged coaxially with the rotational axis of the photosensitive drum 101. In this case, with a configuration in which the projections 63*c* and 64*c* are respectively positioned by the guide members 160 and 162, it is possible to enhance the positioning accuracy of the photosensitive drum 101 with respect to the apparatus body 1.

Openings of Process Cartridge

Openings disposed in the process cartridge 2 will be described. Hereinafter, a space that is, in a cross section perpendicular to the X direction (refer to FIG. 1), surrounded by the first and second units 2A and 2B and the exposure opening 60L of the process cartridge 2, and that extends between the side frames 63 and 64 in the X direction, is referred to as an airflow space 60S of the process cartridge 2. The airflow space 60S is an internal space of the process cartridge 2 (internal space of the casing 60), and the exposure opening 60L can be referred to as an opening through which the airflow space 60S is communicated with an exterior of the process cartridge 2. The surface of the photosensitive drum 101 and the surface of the developing roller 104 are exposed to the airflow space 60S. The airflow space 60S is a space in which the airflow (the cooling airflow from the fan 30) can flow along the surfaces of the photosensitive drum 101 and the developing roller 104 in the interior of the process cartridge 2. The airflow space 60S functions as an air passage formed in the interior of the process cartridge 2.

As illustrated in FIG. 4A, an air inlet hole 110 to take the cooling airflow from an exterior of the process cartridge 2 into the airflow space 60S is formed in the side frame 63 on the −X side of the process cartridge 2. The air inlet hole 110 is a through hole penetrating through the side frame 63 in the X direction. When viewed in the X direction, the airflow space 60S is observable from the outside of the process cartridge 2 through the air inlet hole 110. To be noted, when viewed in the X direction, it is more preferable that the photosensitive drum 101 and the developing roller 104 are observable through the air inlet hole 110.

An outer side edge (−X side edge) of the air inlet hole 110 in the X direction is referred to as the second opening OP2 of the process cartridge 2. As described above, the side frame 63 forms at least part of the side face (first side surface) on the −X side of the process cartridge 2. That is, the second opening OP2 of the present example is formed in the first side surface of the process cartridge 2, and communicates with the airflow space 60S inside the process cartridge 2.

As illustrated in FIG. 4B, an air discharge hole 111 discharging the cooling airflow from the airflow space 60S in the interior of the process cartridge 2 to the exterior of the process cartridge 2 is formed in the side frame 64 on the +X side of the process cartridge 2. The air discharge hole 111 is a through hole penetrating through the side frame 64 in the X direction. When viewed in the X direction, the photosensitive drum 101 and the developing roller 104 are observable from the outside of the process cartridge 2 through the air discharge hole 111.

An outer edge (+X side edge) of the air discharge hole 111 in the X direction is referred to as the third opening OP3 of the process cartridge 2. As described above, the side frame 64 forms at least part of the side surface (second side surface) on the +X side of the process cartridge 2. That is, the third opening OP3 of the present example is formed in the second side surface of the process cartridge 2, and communicates with the airflow space 60S inside the process cartridge 2.

It is preferable that, when viewed in the X direction, the second and third openings OP2 and OP3 of the process cartridge 2 overlap. That is, in a case where the second and third openings OP2 and OP3 are projected onto an imaginary plane orthogonal to the X direction, projected regions of the second and third openings OP2 and OP3 preferably overlap at least partially. Further, the air inlet hole 110 and the air discharge hole 111 of the process cartridge 2 preferably overlap when viewed in the X direction.

The cooling airflow taken from the exterior of the process cartridge 2 into the airflow space 60S through the air inlet hole 110 cools elements such as the photosensitive drum 101, the developing roller 104, and the toner borne on the developing roller 104, while mainly flowing through the airflow space 60S along the X direction. Then, at least part of the cooling airflow is discharged to the exterior of the process cartridge 2 through the air discharge hole 111. However, the above description is an example of paths through which the cooling airflow flows, and, for example, part of the cooling airflow taken into the airflow space 60S may be discharged to the exterior of the process cartridge 2 through paths (for example, the exposure opening 60L) other than a path passing through the air discharge hole 111.

Further, part of the cooling airflow that the fan 30 generates may cool the process cartridge 2 through paths other than a path passing through the airflow space 60S. In the present example, part of the cooling airflow that the fan 30 generates mainly flows along a lower surface of the second unit 2B of the process cartridge 2 through the ventilation holes 161*a* (refer to FIG. 3) disposed in the guide member 161 described above, and cools the toner in the interior of the second unit 2B.

Positional Relationships among Openings of Apparatus Body and Process Cartridge

Figure 5B:
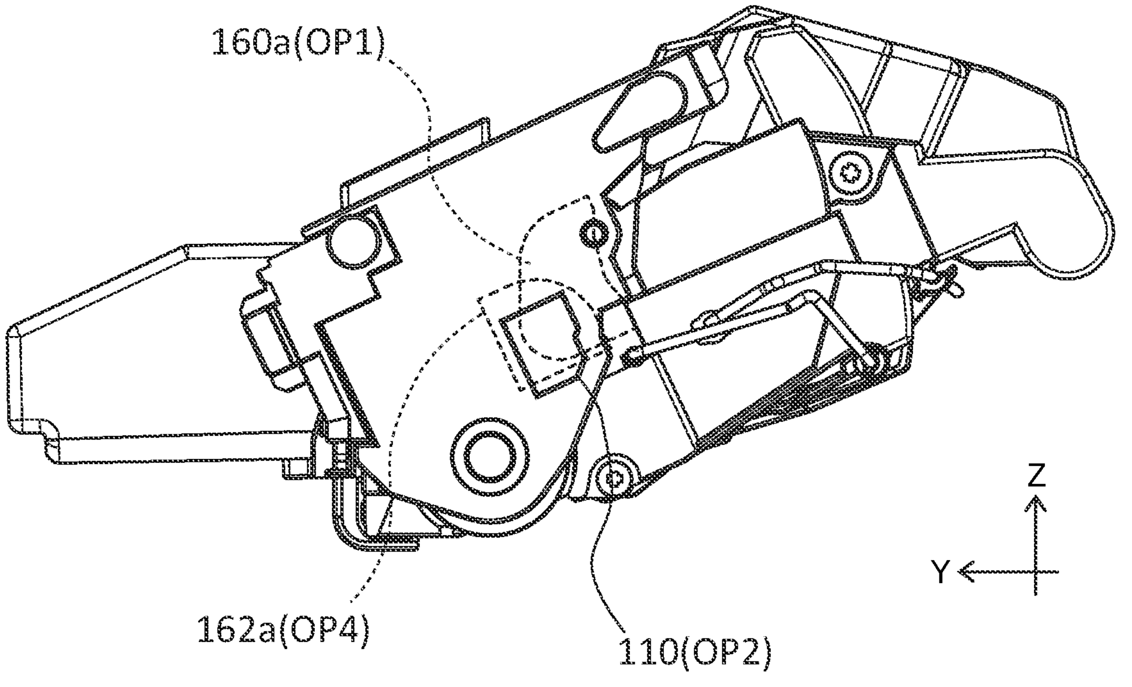
Figure 6B:
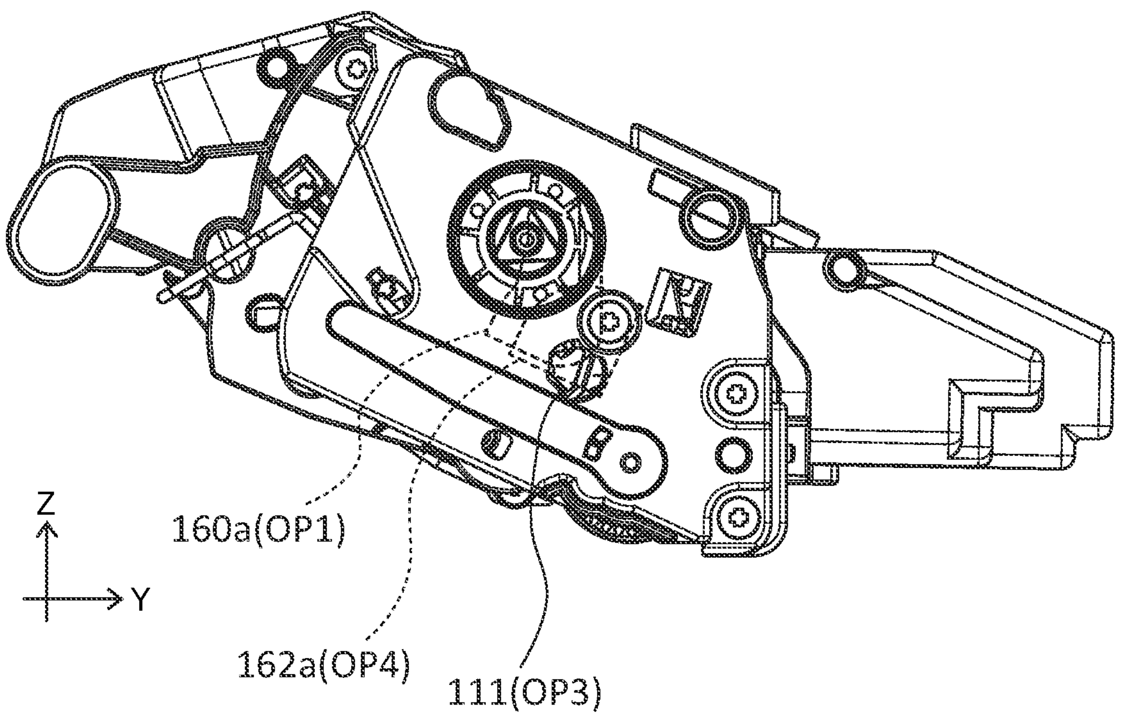
Figure 7A:
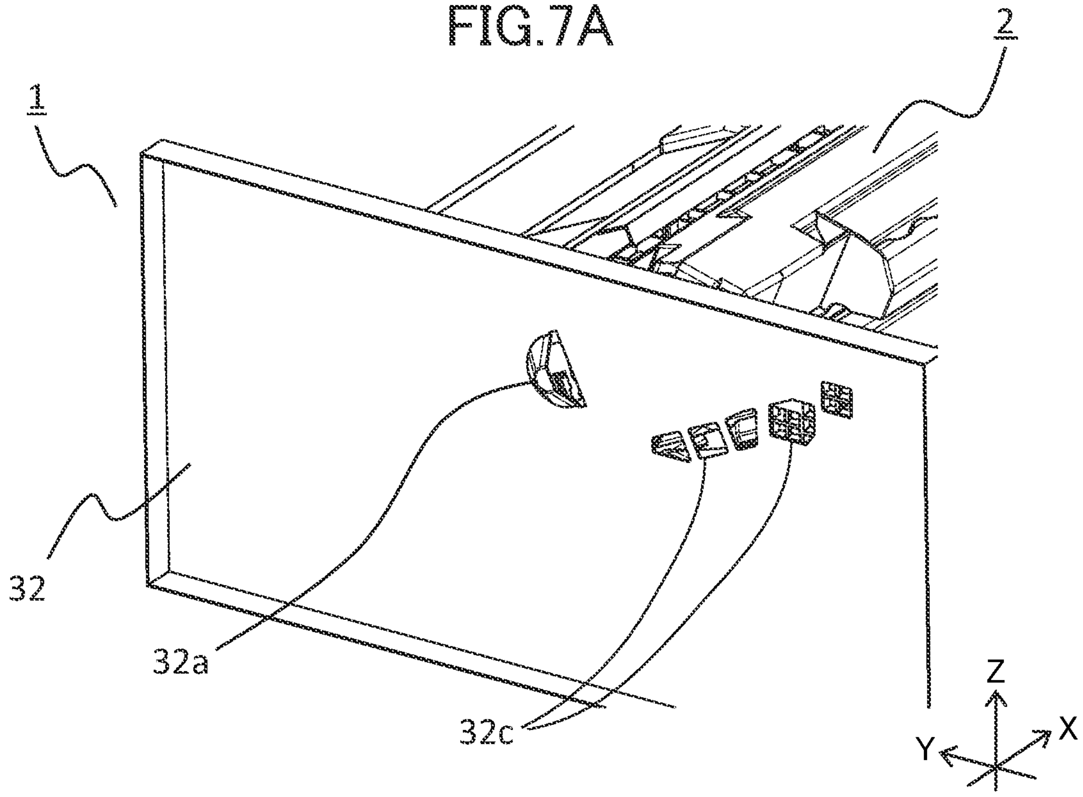
FIGS. 7A and 7B are diagrams illustrating positional relationships among openings of the apparatus body and openings of the process cartridge of the first embodiment.
Figure 7B:
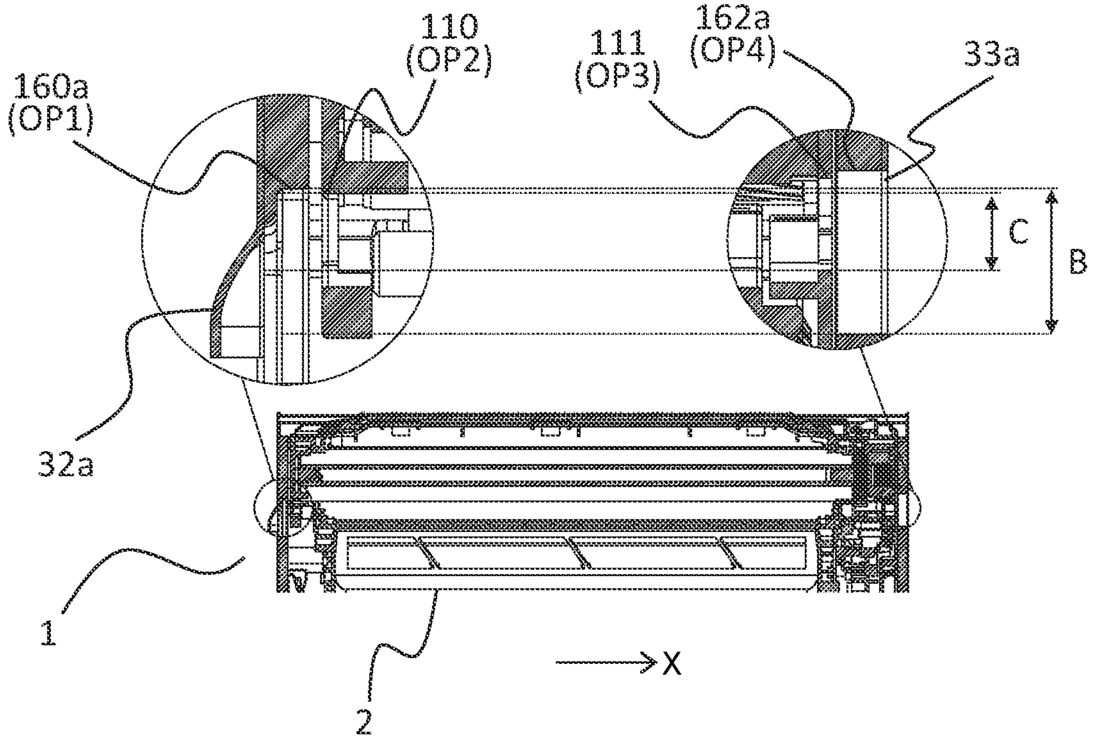

Using FIGS. 5A, 5B, 6A, 6B, 7A, and 7B, positional relationships among the first and fourth openings OP1 and OP4 of the apparatus body 1 and the second and third openings OP2 and OP3 of the process cartridge 2 will be described. FIG. 5B is a side view with the outline of the fourth opening OP4 superimposed onto FIG. 5A. FIG. 6B is a side view with the outline of the first opening OP1 superimposed onto FIG. 6A. FIG. 7A is a perspective view illustrating the apparatus body 1 and the process cartridge 2 that is attached into the apparatus body 1. A lower section of FIG. 7B illustrates a cross-sectional view obtained by cutting devices of FIG. 7A by a plane along the X direction (a plane passing through the first to fourth openings OP1 to OP4), and an upper section of FIG. 7B illustrates enlarged views of segments thereof.

As illustrated in FIG. 5A, in the state (refer to FIG. 7A) in which the process cartridge 2 is attached to the apparatus body 1, the first opening OP1 of the apparatus body 1 and the second opening OP2 of the process cartridge 2 overlap when viewed in the X direction. In other words, the first and second openings OP1 and OP2 of the present example overlap when viewed in the rotational axis direction of the photosensitive drum 101.

With this configuration, the cooling airflow blown from the first opening OP1 can directly reach the second opening OP2, and is taken into the airflow space 60S in the interior of the process cartridge 2 via the second opening OP2. Therefore, in comparison with a case where, when viewed in the X direction, the first and second openings OP1 and OP2 do not overlap, it is possible to reduce the loss of the cooling airflow from the first opening OP1 to the second opening OP2. Here, the loss of the cooling airflow means a decrease in an airflow amount passing through the second opening OP2 with respect to an airflow amount passing through the first opening OP1.

That is, with the configuration of the present example, it is possible to provide an image forming apparatus capable of cooling the interior of the process cartridge 2 more efficiently.

Further, in the present example, when viewed in the X direction, an opening area of the second opening OP2 is smaller than an opening area of the first opening OP1. Thereby, it is possible to increase the wind speed of the cooling airflow that is blown into the airflow space 60S in the interior of the process cartridge 2 via the second opening OP2, and is possible to efficiently cool the interior of the process cartridge 2 across the whole area in the X direction.

Further, as illustrated in FIG. 6A, in the state (refer to FIG. 7A) in which the process cartridge 2 is attached into the apparatus body 1, the third opening OP3 of the process cartridge 2 and the fourth opening OP4 of the apparatus body 1 overlap when viewed in the X direction. In other words, the third and fourth openings OP3 and OP4 of the present example overlap when viewed in the rotational axis direction of the photosensitive drum 101.

With this configuration, in comparison with a case where, when viewed in the X direction, the third and fourth openings OP3 and OP4 do not overlap, it is possible to discharge the cooling airflow discharged from the third opening OP3 to the outside of the image forming apparatus 100 more smoothly. The smooth discharge of the cooling airflow leads to a decreased pressure drop across the entire path of the cooling airflow inside of the image forming apparatus 100. In a case where a constant volume of the cooling airflow is supplied to the airflow space 60S in the interior of the process cartridge 2, a lower overall pressure drop across the entire path of the cooling airflow results in a reduced drive load on the fan 30. Therefore, it becomes possible to cool the interior of the process cartridge 2 more efficiently. Further, according to the present example, it is also advantageous for reducing the power consumption of the fan 30 and decreasing noise levels.

Further, it is preferable that all of the first, second, third, and fourth openings OP1, OP2, OP3, and OP4 overlap when viewed in the X direction. That is, in a case where the first, second, third, and fourth openings OP1, OP2, OP3, and OP4 are projected onto an imaginary plane orthogonal to the X direction, it is preferable that the respective projected regions at least partially overlap. In the present example, as illustrated in FIGS. 5B, 6B, and 7B, the first, second, third, and fourth openings OP1, OP2, OP3, and OP4 overlap in a region C. With this configuration, by further reducing the loss and/or pressure drop of the cooling airflow, it becomes possible to cool the interior of the process cartridge 2 further efficiently.

Further, in the present example, the first opening OP1 is disposed in the guide member 160 that guides the guided portions of the process cartridge 2 when attaching and detaching the process cartridge 2. Therefore, by narrowing a gap between the first and second openings OP1 and OP2 in the X direction, it is possible to further reduce the loss of the cooing airflow between the first and second openings OP1 and OP2.

Further, in the present example, the fourth opening OP4 is disposed in the guide member 162 that engages with the engaged portions of the process cartridge 2 when attaching and detaching the process cartridge 2. Therefore, by narrowing a gap between the third and fourth openings OP3 and OP4 in the X direction, it is possible to further reduce the loss of the cooing airflow between the third and fourth openings OP3 and OP4.

Variant Example

While, in the first embodiment, the cooling airflow is blown from the ventilation hole 160*a* of the guide member 160 toward the process cartridge 2, as a variant example, the cooling airflow may be directly blown from the ventilation hole 32*al* toward the process cartridge 2. That is, when viewed in the X direction, the ventilation hole 32*al* of the side frame 32 may be disposed in a position different from the guide member 160. In such a case, an opening on the +X side of the ventilation hole 32*al* of the side frame 32 may be referred to as the first opening OP1.

Further, as another variant example, a fan that generates the cooling airflow may be secured to the side frame 33 that is on a discharging side. In this case, the cooling airflow passing through the air-blowing duct portion 40 is generated by the negative pressure that the fan generates. Even in this configuration, applying the positional relationships described in the first embodiment to the first, second, third, and fourth openings OP1, OP2, OP3, and OP4, it is possible to obtain advantages similar to the first embodiment. To be noted, the fan of the variant example described above may be used with the fan 30 of the first embodiment.

Second Embodiment

A second embodiment of this disclosure will be described. In the present example, a configuration of the air-blowing duct portion 40 is partly different from the first embodiment. Hereinafter, elements on which reference characters common to the first embodiment are put are, unless specifically described otherwise, presumed to have substantially the same configurations and functions as those described in the first embodiment, and portions different from the first embodiment will be mainly described.

Figure 8A:
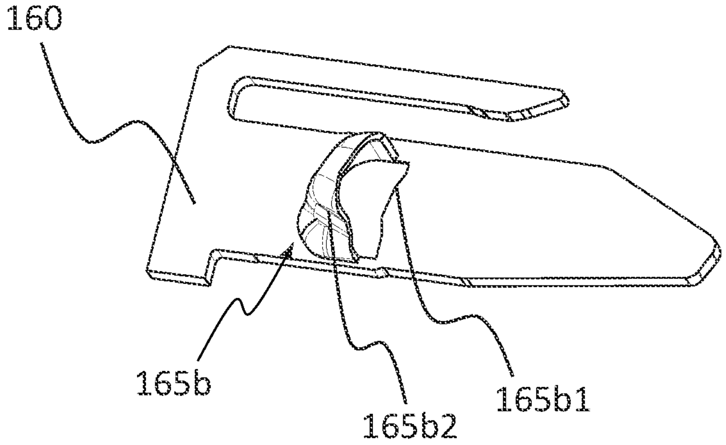
FIG. 8A is a perspective view illustrating a guide member of a second embodiment, and diagrams in FIG. 8B are cross-sectional views illustrating a configuration of an apparatus body of the second embodiment.

FIG. 8A is a perspective view illustrating a guide member 160 of the second embodiment. Diagrams in a lower section of FIG. 8B are cross-sectional views illustrating a configuration of the apparatus body 1 of the second embodiment, and diagrams in an upper section of FIG. 8B each are enlarged views of segments thereof.

Figure 8B:
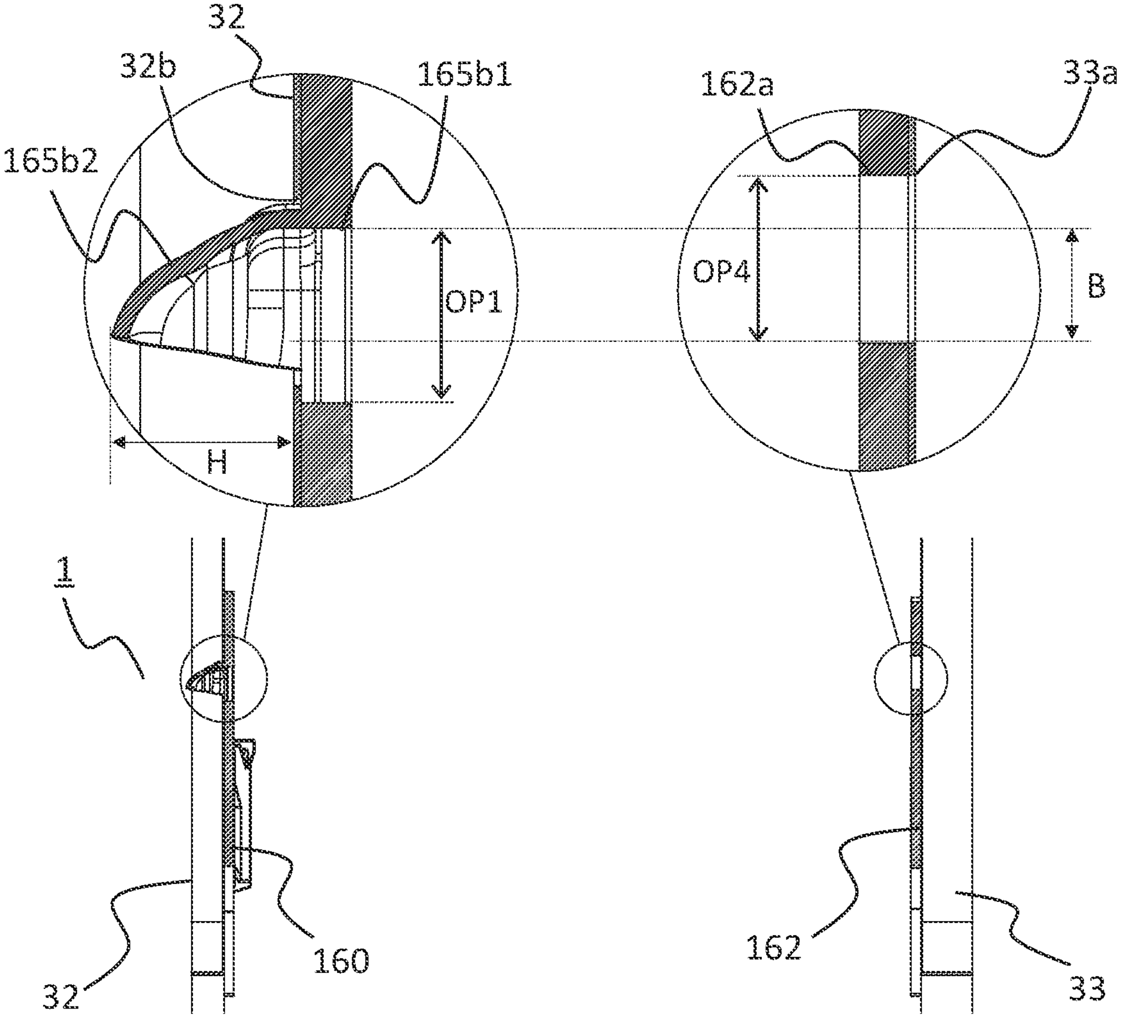

As illustrated in FIGS. 8A and 8B, the guide member 160 of the second embodiment includes an air passage forming portion 165*b*. The air passage forming portion 165*b* includes a ventilation hole 165*b*1 penetrating through the guide member 160 in the X direction, and an intake portion 165*b*2 formed so as to project outward in the X direction with respect to the ventilation hole 165*b*1.

An opening portion (+X side edge of the ventilation hole 165*b*1) at which the ventilation hole 165*b*1 of the guide member 160 is open to the attachment space 2S is referred to as the first opening OP1 of the present example. When viewed in the X direction, the first and fourth openings OP1 and OP4 of the apparatus body 1 overlap in the region B (refer to FIG. 8B).

A through hole 32*b* penetrating through the side frame 32 in the X direction is formed in the side frame 32. The intake portion 165*b*2 of the guide member 160 projects outward (−X side) in the X direction at a height H via the through hole 32*b*, and is formed so as to cover the ventilation hole 165*b*1 when viewed in the X direction. The intake portion 165*b*2 is formed integrally with the guide member 160, and is an example of a projecting shape (projecting portion) that projects to the second side (−X side) in the rotational axis direction of the photosensitive drum 101 with respect to the side frame 32 (frame member, side plate) through the through hole 32*b* of the side frame 32. In other words, in the X direction (rotational axis direction of the photosensitive drum), the intake portion 165*b*2 projects in a direction away from the attachment space 2S into which the process cartridge 2 is attached. Further, the side frame 32 (frame member, side plate) includes the through hole 32*b* (hole) into which the intake portion 165*b*2 (projecting portion) is inserted, and the intake portion 165*b*2 projects from the +X side (first side) toward the −X side (second side) through the through hole 32*b*.

The intake portion 165*b*2 includes an opening configured to take in the cooling airflow. As with the intake portion 32*a*2 (refer to FIGS. 3A and 3B) of the first embodiment, the intake portion 165*b*2 of the present example is formed substantially in the hemispherical shape opening toward the base side (side that is close to the fan 30) of the holder 31. That is, the present example is said to be an example that replaces the intake portion 32*a*2, which is formed integrally with the side frame 32 in the first embodiment, with the intake portion 165*b*2 which is formed integrally with the guide member 160.

To be noted, it is possible to form the air discharging path in the apparatus body 1 in the same configuration as the first embodiment. That is, as illustrated in FIG. 8B, the apparatus body 1 includes the ventilation hole 162*a* formed in the guide member 162 and the ventilation hole 33*a* formed in the side frame 33. The ventilation hole 162*a* of the guide member 162 and the ventilation hole 33*a* of the side frame 33 are part of the air discharging path (discharging duct portion) that discharges the cooling airflow, which has cooled the cooling objects, such as the process cartridge 2, in the interior of the apparatus body 1, to the outside of the apparatus body 1.

Figure 9A:
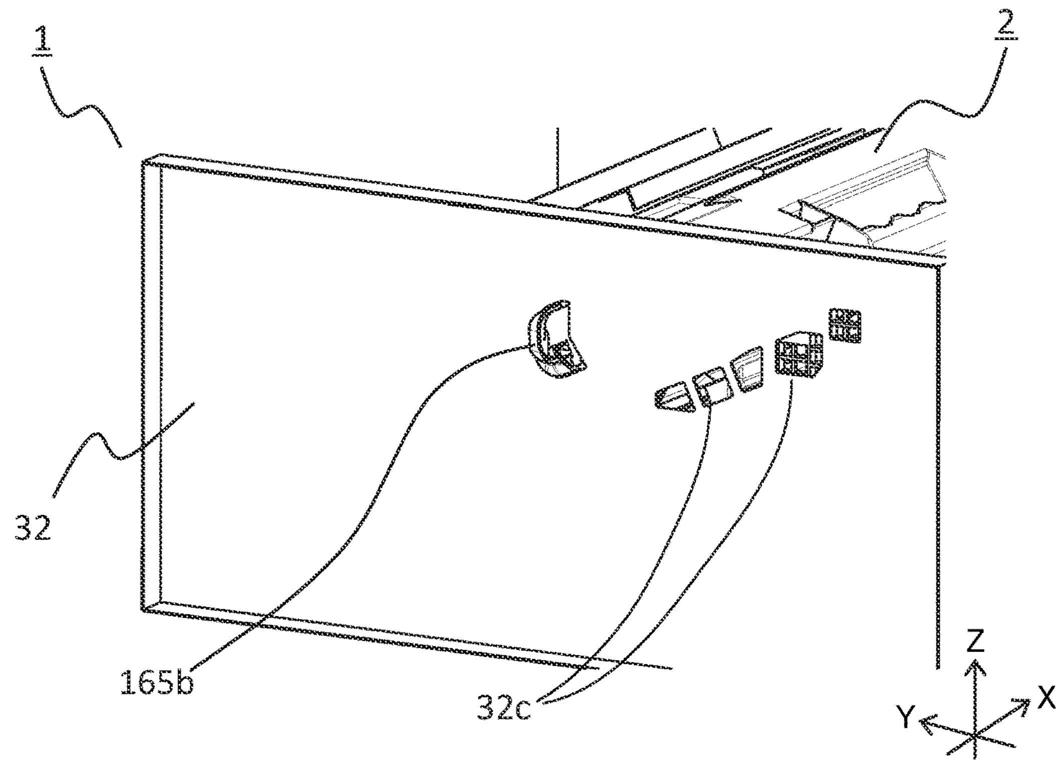
FIGS. 9A and 9B are diagrams illustrating positional relationships among openings of the apparatus body and openings of the process cartridge of the second embodiment.

FIG. 9A is a perspective view illustrating the apparatus body 1 and the process cartridge 2 that is attached into the apparatus body 1. A lower section of FIG. 9B is a cross-sectional view illustrating devices in FIG. 9A cut by a plane (plane that passes through OP1 to OP4) along the X direction, and diagrams in an upper section of FIG. 9B are enlarged views of segments thereof.

Figure 9B:
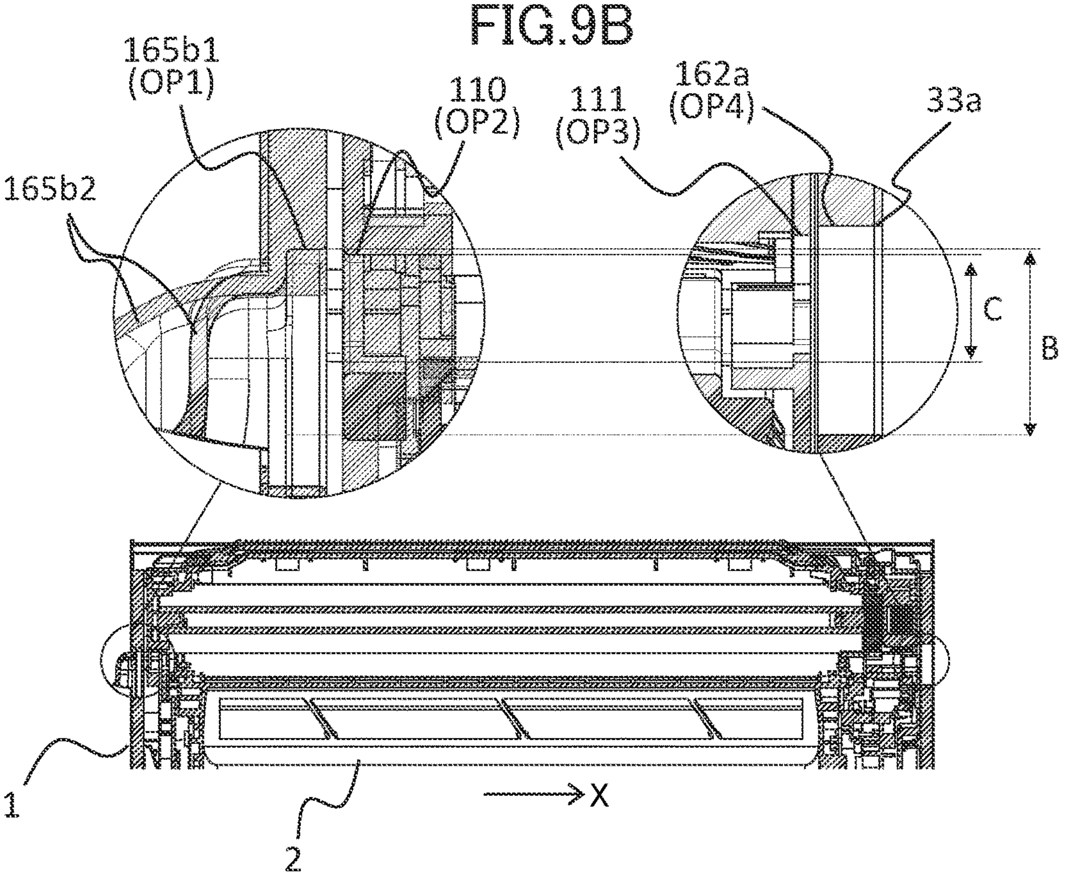

As illustrated in FIG. 9B, in the state in which the process cartridge 2 is attached into the apparatus body 1 (refer to FIG. 9A), the first opening OP1 of the apparatus body 1 and the second opening OP2 of the process cartridge 2 overlap when viewed in the X direction. Therefore, it is possible to reduce the loss of the cooling airflow from the first opening OP1 to the second opening OP2.

That is, with the configuration of the present example, it is possible to provide an image forming apparatus capable of cooling the interior of the process cartridge 2 more efficiently.

Further, the third opening OP3 of the process cartridge 2 and the fourth opening OP4 of the apparatus body 1 overlap when viewed in the X direction. With this configuration, it is possible to discharge the cooling airflow discharged from the third opening OP3 to the outside of the image forming apparatus 100 more smoothly, and is possible to reduce a pressure drop of the cooling airflow.

Further, the first, second, third, and fourth openings OP1. OP2, OP3, and OP4 overlap in the region C. With this configuration, by further reducing the loss and the pressure drop of the cooling airflow, it becomes possible to cool the interior of the process cartridge 2 further efficiently.

Further, the intake portion 165*b*2, serving as the projecting shape (projecting portion) of the present example, is formed integrally with the guide member 160 using, for example, a synthetic resin. As with the first embodiment, in a case where the projecting shape is formed by drawing the side frame 32 made of sheet metal, sometimes, the projection height of the projecting shape (projecting portion) is limited. In a case where, as with the present example, the intake portion 165*b*2 and the guide member 160 are formed integrally using the synthetic resin, it is relatively easy to increase a height H (refer to FIG. 8B) at which the intake portion 165*b*2 projects with respect to the side frame 32. Thereby, it is possible to increase an opening area of the intake portion 165*b*2, and is possible to guide the cooling airflow from the fan 30 toward the process cartridge 2 more efficiently.

Other Embodiments

In any of the examples described above, the single process cartridge 2 is attached into the apparatus body 1 of the image forming apparatus 100. It is not limited to this, and, as with a color image forming apparatus forming a color image using the developer (toner) of a plurality of colors, a plurality of process cartridges 2 may be attached with respect to the apparatus body 1. Even in this case, if the positional relationships described in the examples are applied to openings that are disposed in the apparatus body 1 for sending the cooling airflow to such as the process cartridges 2, and to openings that are disposed for allowing passage of the cooling airflow, it is possible to obtain advantages similar to the examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-012670, filed on Jan. 31, 2023, which is hereby incorporated by reference herein in its entirety.

According to the present disclosure, it is possible to provide an image forming apparatus capable of cooling an interior of a process cartridge more efficiently.

What is claimed is:

1. An image forming apparatus comprising:
an apparatus body including a fan and a duct portion through which airflow generated by the fan flows, the duct portion including (i) a first opening from which the airflow blows and (ii) a projecting portion configured to guide the airflow to the first opening; and
a process cartridge that is detachable from the apparatus body and is attached to the apparatus body in a position in which the process cartridge receives the airflow blown from the first opening, the process cartridge including:
a photosensitive drum,
a developing roller configured to supply developer to the photosensitive drum, and
a casing including a side frame, the side frame including a first side surface in which a second opening is formed,
wherein the second opening communicates with a space inside the process cartridge, to which a surface of the photosensitive drum and a surface of the developing roller are exposed,
wherein, when viewed in a rotational axis direction of the photosensitive drum, the first opening and the second opening overlap,
wherein the second opening is a through-hole penetrating through the side frame in the rotational axis direction, and
wherein, in the rotational axis direction, the projecting portion projects in a direction away from an attachment space in which the process cartridge is attached.

2. The image forming apparatus according to claim 1,
wherein the casing includes a second side surface in which a third opening communicating with the space is formed,
wherein the second side surface is a surface opposite to the first side surface in the rotational axis direction,
wherein the apparatus body includes a fourth opening configured to receive the airflow that has been discharged from the third opening to an exterior of the process cartridge, and
wherein the third opening and the fourth opening overlap when viewed in the rotational axis direction.

3. The image forming apparatus according to claim 2,
wherein, when viewed in the rotational axis direction, the first opening, the second opening, the third opening, and the fourth opening overlap.

4. The image forming apparatus according to claim 1,
wherein the process cartridge includes a guided portion, and
wherein the apparatus body includes:
a side plate extending in a direction intersecting with the rotational axis direction, and
a guide member configured to guide the guided portion in a case where the process cartridge is attached to and detached from the apparatus body.

5. The image forming apparatus according to claim 4,
wherein the first opening of the duct portion is formed in the guide member.

6. The image forming apparatus according to claim 5,
wherein the projecting portion is formed integrally with the side plate.

7. The image forming apparatus according to claim 5,
wherein the process cartridge is arranged on a first side in the rotational axis direction with respect to the side plate,
wherein the fan is arranged on a second side in the rotational axis direction with respect to the side plate,
wherein the side plate includes a hole into which the projecting portion is inserted, and
wherein the projecting portion projects from the first side toward the second side through the hole.

8. The image forming apparatus according to claim 5,
wherein the projecting portion is formed integrally with the guide member.

9. The image forming apparatus according to claim 4,
wherein the process cartridge is arranged on a first side in the rotational axis direction with respect to the side plate,
wherein the fan is arranged on a second side in the rotational axis direction with respect to the side plate,
wherein the side plate includes a hole into which the projecting portion is inserted, and
wherein the projecting portion projects from the first side to the second side through the hole.

10. The image forming apparatus according to claim 9,
wherein the projecting portion is formed integrally with the guide member.

11. The image forming apparatus according to claim 1,
wherein, when viewed in the rotational axis direction, the projecting portion overlaps the first opening.

12. The image forming apparatus according to claim 1,
wherein, when viewed in the rotational axis direction, an opening area of the second opening is smaller than an opening area of the first opening.

13. The image forming apparatus according to claim 1,
wherein the casing includes a first frame and a second frame,
wherein the process cartridge includes a first unit in which the first frame and the photosensitive drum are provided, and a second unit in which the second frame and the developing roller are provided,
wherein a gap through which light to expose the photosensitive drum passes is formed between the first frame and the second frame, and
wherein, in a cross section perpendicular to the rotational axis direction, the space inside the process cartridge is surrounded by the photosensitive drum, the first frame, the developing roller, the second frame, and the gap.

14. The image forming apparatus according to claim 13, wherein the second frame is movable with respect to the first frame.

15. An image forming apparatus comprising:

an apparatus body including a fan and a duct portion through which airflow generated by the fan flows, the duct portion including (i) a first opening from which the airflow blows and (ii) a projecting portion configured to guide the airflow to the first opening; and a process cartridge that is detachable from the apparatus body and is attached to the apparatus body in a position in which the process cartridge receives the airflow blown from the first opening, the process cartridge including:

a photosensitive drum, a developing roller configured to supply developer to the photosensitive drum, a casing including a first side surface in which a second opening is formed, and a guided portion, wherein the second opening communicates with a space inside the process cartridge, to which a surface of the photosensitive drum and a surface of the developing roller are exposed, wherein, when viewed in a rotational axis direction of the photosensitive drum, the first opening and the second opening overlap, wherein, in the rotational axis direction, the projecting portion projects in a direction away from an attachment space in which the process cartridge is attached, wherein the apparatus body further includes a side plate extending in a direction intersecting with the rotational axis direction and a guide member configured to guide the guided portion in a case in which the process cartridge is attached to and detached from the apparatus body, wherein the process cartridge is arranged on a first side in the rotational axis direction with respect to the side plate, wherein the fan is arranged on a second side in the rotational axis direction with respect to the side plate, wherein the side plate includes a hole into which the projecting portion is inserted, and wherein the projecting portion projects from the first side to the second side through the hole.

16. The image forming apparatus according to claim 15, wherein the casing includes a second side surface in which a third opening communicating with the space is formed, wherein the second side surface is a surface opposite to the first side surface in the rotational axis direction, wherein the apparatus body includes a fourth opening configured to receive the airflow that has been discharged from the third opening to an exterior of the process cartridge, and wherein the third opening and the fourth opening overlap when viewed in the rotational axis direction.

17. The image forming apparatus according to claim 16, wherein, when viewed in the rotational axis direction, the first opening, the second opening, the third opening, and the fourth opening overlap.

18. The image forming apparatus according to claim 15, wherein the first opening of the duct portion is formed in the guide member, wherein the projecting portion is formed integrally with the guide member, and wherein, when viewed in the rotational axis direction, the projecting portion overlaps with the first opening.

19. The image forming apparatus according to claim 15, wherein the casing includes a first frame and a second frame, wherein the process cartridge includes a first unit in which the first frame and the photosensitive drum are provided, and a second unit in which the second frame and the developing roller are provided, wherein a gap through which light to expose the photosensitive drum passes is formed between the first frame and the second frame, and wherein, in a cross section perpendicular to the rotational axis direction, the space inside the process cartridge is surrounded by the photosensitive drum, the first frame, the developing roller, the second frame, and the gap.

20. The image forming apparatus according to claim 19, wherein the second frame is movable with respect to the first frame.

* * * * *